United States Patent
Anhut et al.

(10) Patent No.: US 10,095,017 B2
(45) Date of Patent: Oct. 9, 2018

(54) MICROSCOPE AND MICROSCOPY METHOD

(71) Applicant: Carl Zeiss Microscopy GmbH, Jena (DE)

(72) Inventors: Tiemo Anhut, Jena (DE); Thomas Kalkbrenner, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/400,167

(22) PCT Filed: May 7, 2013

(86) PCT No.: PCT/EP2013/001350
§ 371 (c)(1),
(2) Date: Nov. 10, 2014

(87) PCT Pub. No.: WO2013/170940
PCT Pub. Date: Nov. 21, 2013

(65) Prior Publication Data
US 2015/0116807 A1 Apr. 30, 2015

(30) Foreign Application Priority Data
May 15, 2012 (DE) .................. 10 2012 010 207

(51) Int. Cl.
*G02B 21/00* (2006.01)
*G02B 26/06* (2006.01)
*G02F 1/01* (2006.01)

(52) U.S. Cl.
CPC ..... *G02B 21/0032* (2013.01); *G02B 21/0068* (2013.01); *G02B 21/0092* (2013.01); *G02B 26/06* (2013.01); *G02F 1/01* (2013.01)

(58) Field of Classification Search
CPC ............ G02B 21/0032; G02B 21/0068; G02B 21/0092; G02B 26/06; G02B 21/00;
(Continued)

(56) References Cited

U.S. PATENT DOCUMENTS

| 2010/0014156 A1 | 1/2010 | Iketaki | |
| 2010/0328674 A1* | 12/2010 | Berguiga | G01B 9/04 356/491 |
| 2012/0268812 A1* | 10/2012 | Anhut | G02B 21/0068 359/386 |

FOREIGN PATENT DOCUMENTS

| DE | 10 2004 034 959 A1 | 2/2006 |
| DE | 10 2004 034 998 A1 | 2/2006 |

(Continued)

OTHER PUBLICATIONS

Notification of Transmittal of Translation of the International Preliminary report on Patentability (Chapter I or Chapter II).
(Continued)

*Primary Examiner* — Mustak Choudhury
(74) *Attorney, Agent, or Firm* — Duane Morris LLP

(57) ABSTRACT

A microscope, preferably a laser scanning microscope, with at least one illuminating beam, which in a partial area along the cross-section thereof, is phase-modulated with a modulation frequency. A microscope objective is provided for focusing the illumination beam onto a sample. The microscope further has a detection beam path and at least one demodulation means, wherein a pulsed illumination beam is present. In the illumination beam path upstream of the microscope objective, a first polarization beam splitter is provided, which generates at least first and second partial beam paths that have differing, preferably adjustable, optical paths. A combination element, such as a second pole splitter, for rejoining the partial beams is provided. In one partial (Continued)

beam path, a phase element is provided, which has at least two areas having differing phase interferences.

25 Claims, 5 Drawing Sheets

(58) Field of Classification Search
CPC ....... G02B 21/06–21/36; G02B 21/002; G02B 21/008; G02B 21/0076; G02B 21/241; G02B 27/283; G02F 1/01; G02F 1/0126; G02F 1/0136; G02F 1/11; G02F 1/116; G01N 21/63; G01N 21/553; G01N 21/648; G01N 21/6458
USPC ....... 359/362, 363, 368, 369, 370, 371, 385, 359/386, 387, 388, 389, 390; 356/364, 356/365, 491, 445
See application file for complete search history.

(56) References Cited

FOREIGN PATENT DOCUMENTS

| DE | 10 2010 013 829 A1 | 9/2011 | |
|---|---|---|---|
| DE | 10 2010 013 830 A1 | 9/2011 | |
| DE | 10 2011 013 613 A1 | 4/2012 | |
| DE | 10 2011 013613 A1 | 4/2012 | |
| EP | 0 500 717 B2 | 11/2003 | |
| JP | 2003 270551 A | 9/2003 | |
| JP | 2004 317646 A | 11/2004 | |
| JP | 2006058477 A | * | 3/2006 |
| JP | 2011 028208 A | | 2/2011 |
| JP | 2011028208 A | * | 2/2011 |
| JP | 2011 197609 A | | 10/2011 |
| JP | 2011197609 A | * | 10/2011 |
| JP | 2012 078802 A | | 4/2012 |
| WO | WO 2009/008 838 A1 | | 1/2009 |
| WO | WO 2012/041502 A1 | | 4/2012 |

OTHER PUBLICATIONS

Wong, Chee Howe, et al.; "Simple spatial phase modulator for focal modulation microscopy"; Applied Optics 2009; 48(17):3237-3242.
Rocha-Mendoza, I., et al.;"Differential coherent anti-Stokes Raman scattering microscopy with linearly chirped femtosecond laser pulses"; Optics Letters 2009; 34(15):2258-2260.
Chen, Nanguang, et al.; "Focal modulation microscopy"; Optics Express 2008; 16(23):18764-18769.
Chong, Shau Poh, et al.; "High-speed focal modulation microscopy using acousto-optical modulators"; Biomedical Optics Express 2010; 1(3):1026-1033.
Leray, Aymeric, et al., "Rejection of two-photon fluorescence background in thick tissue by differential aberration imaging", Optics Express 2006; 14(22):10565-10573.
Sueda, K., et al., "Laguerre-Gaussian beam generated with a multilevel spiral phase plate for high intensity laser pulses", Optics Express 2004; 12(15):3548-3553.
English translation of the Notification of Reasons for Rejection from the Japanese Patent Office.

* cited by examiner

MICROSCOPE AND MICROSCOPY METHOD

RELATED APPLICATIONS

The present application is a U.S. National Stage application of International PCT Application No. PCT/EP2013/001350 filed on May 7, 2013 which claims priority benefit of German Application No. DE 10 2012 010 207.0 filed on May 15, 2012, the contents of each are incorporated by reference in their entirety.

BACKGROUND OF THE INVENTION

Prior Literature/Patents

[1] Chen et al., Opt. Express 16, 18764 (2008)
[2] Wong et al., Appl. Opt. 48, 3237 (2009)
[3] WO2009/008838
[4] A. Leray and J. Mertz, Opt. Express 14, 10565 (2006)
[5] DE102011013613, DE102010013829
[6] EP500717 B2 Two-Photon Microscopy
[7] Sueda et al., Opt. Express 12, 3548 (2004)
[8] Chong et al., Biomedical Optics Express Vol. 1 No. 3
[9] Israel Rocha-Mendoza, Wolfgang Langbein, Peter Watson, and Paola Borri, "Differential coherent anti-Stokes Raman scattering microscopy with linearly chirped femtosecond laser pulses," Opt. Lett. 34, 2258-2260 (2009)

The temporal focal modulation technique (FMM) is a method that is used in fluorescence microscopy, in order to be able to switch rapidly between different focusing fields. This feature is especially important when one would like to influence only the light in the focus of one objective lens. To this end, a method, with which a three dimensional imaging of optically thick samples with simultaneous discrimination of background light is possible, has already been demonstrated in the literature [1 to 4].

This method is based on the concept that a property (for example, the fluorescence), which is generated more or less in focus, is influenced in real time in such a way that this property (the fluorescence) is not modulated out of the focus.

To date this method has been based on the rapid switching of the optical phase in the pupil of an objective lens. To date it has been demonstrated, above all, that the phase is shifted in two half pupils.

Similar to the half pupil switching, described above, it may also be advantageous to use the switching between the optical phases of other partial beams in the pupil. Moreover, it is advantageously possible to use not only the phases, but also, in general, the field mode switching, in order to generate a temporal modulation of the emission from the focal volume. In this case the radiation is not modulated in real time outside the focal volume.

FIG. 1 shows the real time switching between two focusing states, which cause a modulation of the fluorescence only in the focus.

The figure shows one example for two focusing states in the cross section. In this case the switching can take place between these two focusing states. It is easily discernible that one of the states has a zero value on the optical axis. Out of focus, the zero value disappears.

In addition to switching phases solely in the pupil, switching of the polarization in combination with a phase plate has also been proposed [5] as an additional option, in order to modulate the radiation coming from the focal volume.

FIG. 2 shows an embodiment of the aforementioned type of focal modulation on the basis of an electro-optical polarization rotator and FIG. 3 shows potential associated variants of the phase plate, where the net result of such variants is a focal modulation. In this respect reference is made to the earlier application DE102011013613 and DE102010013829.

All of the possible focal modulation techniques benefit from modulation frequencies of several MHz. Therefore, in principle, they lend themselves well to an advantageous use in laser scanning microscopes (LSM), in order to increase the penetration depth without sacrificing the scan rate. The scan rate can be further increased by parallelization using multi-spot microscopy. However, a slower modulation is still possible and may be adjusted accordingly.

Owing to the advantageous high modulation frequencies it is possible to consider essentially rapid switching optoelectronic elements, such as acousto-optical modulators [AOMs] and electro-optical modulators [EOMs]. These components are capable of switching the polarization very rapidly in real time, as a result of which polarization-dependent phase deviations can be introduced in different spatial areas, preferably in an objective lens pupil (FIG. 2).

Therefore, it is possible to achieve a switch-over of the phases by switching the polarization state. These solutions make it possible to switch a property that ultimately more or less affects the field in focus and, as a result, the focusing field is modulated, while the essential portions that are out of focus are not significantly modulated.

FIG. 2 shows such a rapid optical mode switch, based on an electro-optical modulator EOM and passive phase elements PP that are arranged in the illuminating beam path. The element PP is in operative connection with the EOM, which causes a rapid rotation of the polarization direction of the incident light beam L, usually a linearly polarized laser beam, by means of a corresponding actuation. After the light beam passes through PP, said light beam continues to travel, as also in the arrangements described below, in the direction of the microscope M through a scanning unit (not shown) to the sample, an arrangement that is also well-known from the prior art. Owing to the phase change on one side through the plate PP the illuminating beam experiences the FMM-typical field modulation.

The phase plates, depicted in FIG. 3, are shown only as an example. In principle, different geometries are conceivable in this case. In this embodiment the passive phase elements, which are shown as an example, consist in each case of a combination of a double refractive crystal. The embodiment shows a phase plate PP in the form of a split lambda/half plate [λ/2 plate], and a component, which is independent of the direction of polarization with respect to the phase and which is made, for example, of glass (FIG. 3). At the same time the phase plate is aligned in such a way that the fast direction of the crystal is advantageously aligned in parallel or perpendicular or at some other optimized angle to the incident laser polarization.

FIG. 3 shows a number of different modifications of the phase plate PP: a one-sided division into a lambda/2 half and a glass half in PP_1, a quartering into diagonal lambda/2 quarters and diagonal glass quarters in PP_2, an outer lambda/2 ring and an inner glass core in PP_3; and, vice-versa, an outer glass ring and an inner lambda/2 core in PP_4.

Glass is listed here only as an example. Amorphous quartz (Suprasil) or other non-double refractive materials can also be used.

In FIG. 3 the orientation of the extraordinary axis of the respective lambda/2 portion is shown as an arrow in PP_1 only as an example. If a beam of light, which is polarized in parallel to this direction of the arrow, passes through this element, then a phase shift of about half a wave length relative to the glass portion is generated in the lambda/2 portion. If, however, its polarization is oriented perpendicular to the direction of the arrow, then no relative phase delay is generated.

It should be added that in order to achieve the desired change in the polarization, it is also possible to use, for example, a nematic crystal, which, however, responds more slowly, or to use structures, which generate a different polarization by way of a path splitting; and this path changes rapidly, for example, by means of an AOM/AOTF (acousto-optic tunable filter).

In general, the polarization state can be varied in real time, for example, in either sinusoidal or rectangular waveform or some other advantageous waveform. This measure makes it possible to have a varied effect over time on the transition between the spatial field distributions in the focus of the microscope.

The advantages of the focal modulation microscopy (FMM) can be summarized as follows:
  an increase in the depth of penetration by reducing the scattered light that is out of focus
  optical cutting—reducing the fluorescence volume
  an increase in the optical resolution At this point it is clearly evident, in particular with reference to FIGS. 2 and 3, that a much greater technical complexity is required to implement the focal modulation. Therefore, the object of the present invention is to implement a simpler, more cost effective proposed solution to the focal modulation.

SUMMARY OF THE INVENTION

According to the invention, it has now been recognized that surprisingly the intrinsic laser modulation frequency of the pulsed light source can be used to generate the focal modulation and, in particular, in an inexpensive way and without a great deal of technical complexity.

If a pulsed light source is used, then the light source itself already contributes advantageously to the modulation frequency so that the advantage to be gained is that it is possible to dispense with the fast switches described above.

Therefore, the technical complexity can be significantly reduced, if only passive elements are used, according to the invention, for the phase modulation.

Similar methods have already been described for other optical purposes. For example, the prior article [9] (see above) discloses a passive arrangement for the modulation in the coherent anti-Stokes Raman scattering [CARS] microspectroscopy. In this case, however, the optical phase is not modulated, but rather a time interval, which varies over time, is introduced between two laser pulses each in such a way that said time interval provides by changing to different contributions in the resulting CARS signal.

It has now been recognized in accordance with the invention that a modulation of the optical phase is possible with just the passive elements alone, wherein the modulation can be in the MHz range, if the laser has a suitably high repetition rate.

BRIEF DESCRIPTION OF THE DRAWINGS

The invention is described in detail below with reference to the schematic drawings, in which.

DESCRIPTION OF THE EMBODIMENTS

Figure 4:
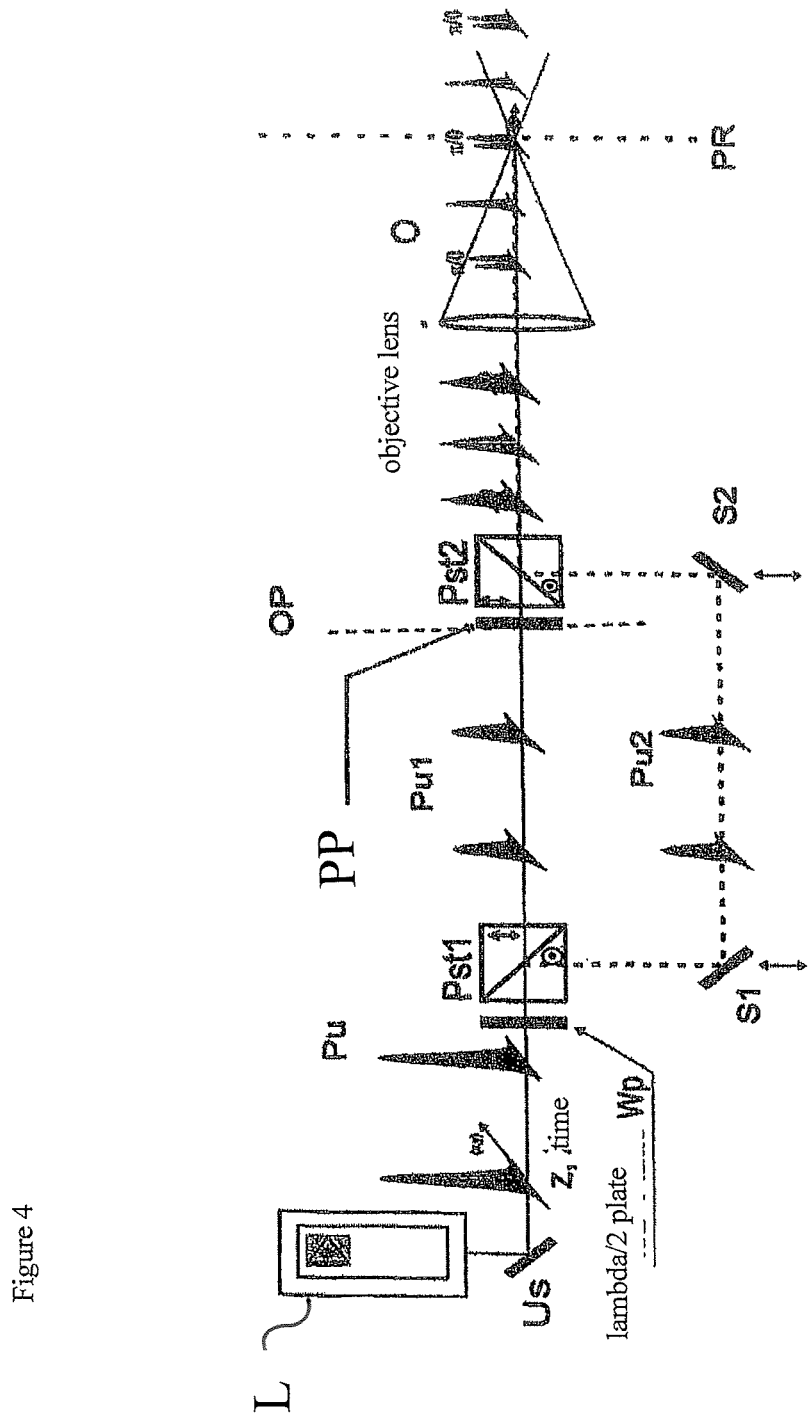
FIG. 4 illustrates an embodiment of the focal modulation utilizing the intrinsic laser modulation frequency.

FIG. 4 shows the principals of the invention in an embodiment of the focal modulation utilizing the intrinsic laser modulation frequency or more specifically the repetition rate.

In FIG. 4 a pulsed laser L is deflected, in this case by means of a deflecting mirror Us, into the optical illuminating beam path of a microscope, which is shown here only in schematic form by means of the microscope objective lens O and the plane of the sample PR.

In the beam path, which is coming from the sample and contains the sample light, means (for example, main beam splitter), which are not shown in this embodiment, are provided in the direction of detection downstream of the objective lens, in order to deflect the sample light in the direction of a detection, which is not shown herein.

Furthermore, the scanning means are not shown; these scanning means are disposed upstream of the objective lens on the illumination side, in order to guide an illuminating beam, which is focused by means of O, a beam distribution or an illuminating line in one or two directions over the sample, through which the sample light passes again backwards in the direction of detection before being blocked in the direction of detection to the descanned detection.

A lambda/2 plate Wp is disposed downstream of the laser L, which emits short pulses Pu. The illuminating light L reaches a first polarizing beam splitter Pst1 and is split into two pulsed components Pu1 and Pu2. The one transmitted component Pu1 passes through a phase plate PP of the pulse train Pu1, said phase plate being disposed preferably in the objective lens pupil or disposed in a plane conjugate to said objective lens pupil, and a second polarizing beam splitter Pst2 in the direction of the sample through the objective lens O.

The second pulse train Pu2 is reflected at S1 and travels by way of the deflecting mirrors S2 and S2 with a time delay with respect to Pu1 to the second polarizing beam splitter Pst2 and is also deflected at said second polarizing beam splitter in the direction of the sample through the objective lens O.

Thus, FIG. 4 shows the principle of the present invention as follows:

(1) The linear polarization of the light pulses from the laser is polarized by means of a lambda/2 or lambda/4 plate in such a way that the polarizing beam splitter Pst1 divides the incoming pulse train into two partial beams or more specifically into two pulse trains that are identical in terms of energy. These two partial beams differ only in the polarization.

(2) However, one of these pulse trains also passes through the phase plate PP in the pupil (FIG. 3), in order to be able to generate a spatially modulated illumination pattern in the objective lens focus (with the zero value on the axis).

(3) Moreover, the two pulse trains are displaced in time in relation to each other, for example, in order not to undershoot, half of the repetition time, and if possible, half of the repetition time should not drop below the fluorescence lifetime, i.e., repetition rates of less than 100 MHz are recommended.

The time delays are caused by the different light paths in the partial beam paths, which can also be adjusted preferably by moving the mirrors S1, S2 perpendicular to the optical axis.

After the polarizing beam splitter PST2 there is, in chronological order, as shown, a change between the pulses PU2 and the pulse trains, which are influenced by PP, with partially delayed phase position in accordance with the FMM principle.

These pulse trains meet in an alternating manner in the objective lens focus (in the sample).

The net result of the principle, depicted in FIG. 4, is a temporal modulation of the fluorescence signal in the focus of the objective lens; the modulation frequency is determined by the repetition rate of the laser. The time-modulated focus signal can be reconstructed by means of the phase sensitive lock-in technique or box car integration of the differential signals of the two extreme points.

Figure 1:
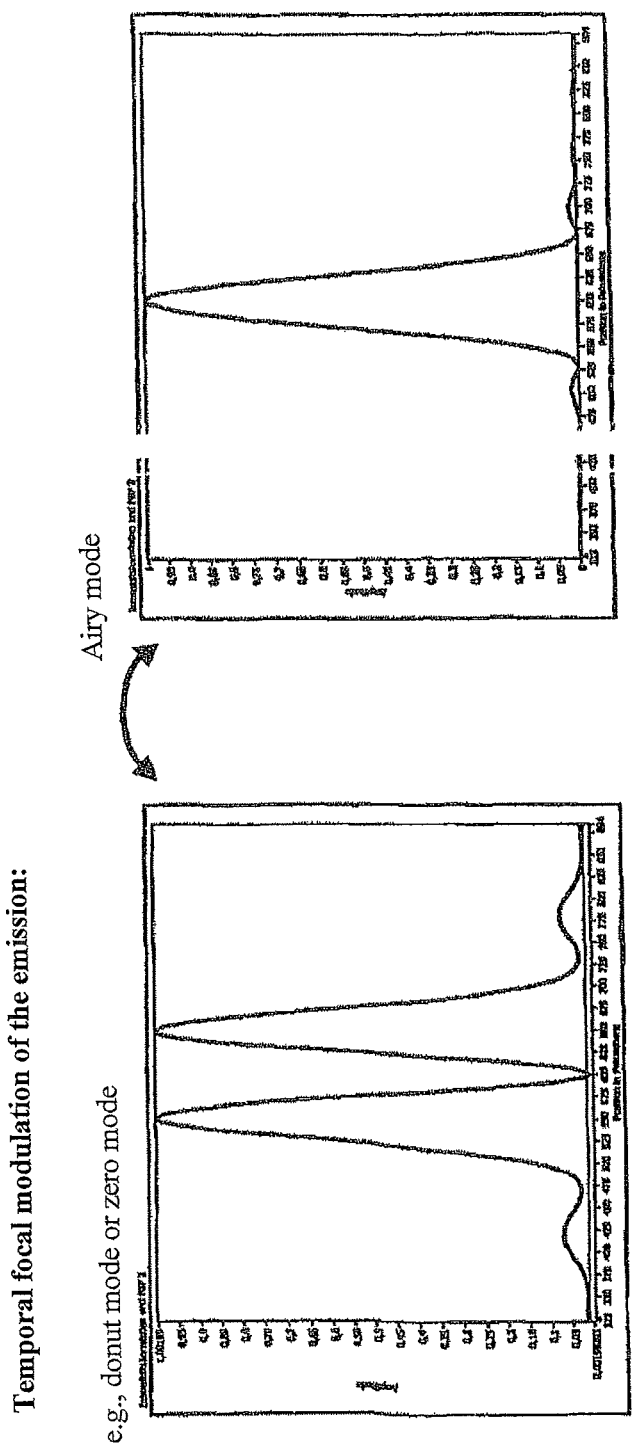
FIG. 1 shows the real time switching between two focusing states, which cause a modulation of the fluorescence only in the focus.
Figure 2:
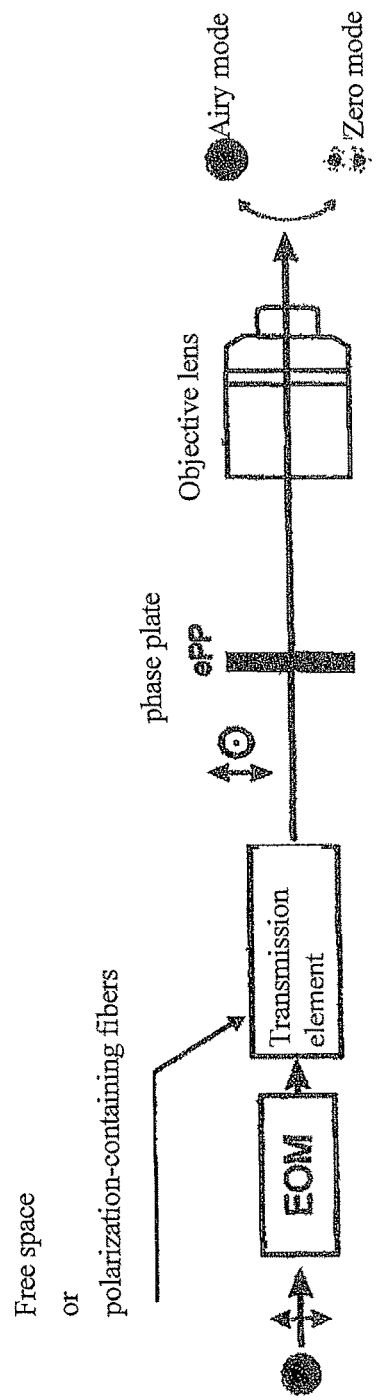
FIG. 2 shows an embodiment of the aforementioned type of focal modulation on the basis of an electro-optical polarization rotator.
Figure 3:
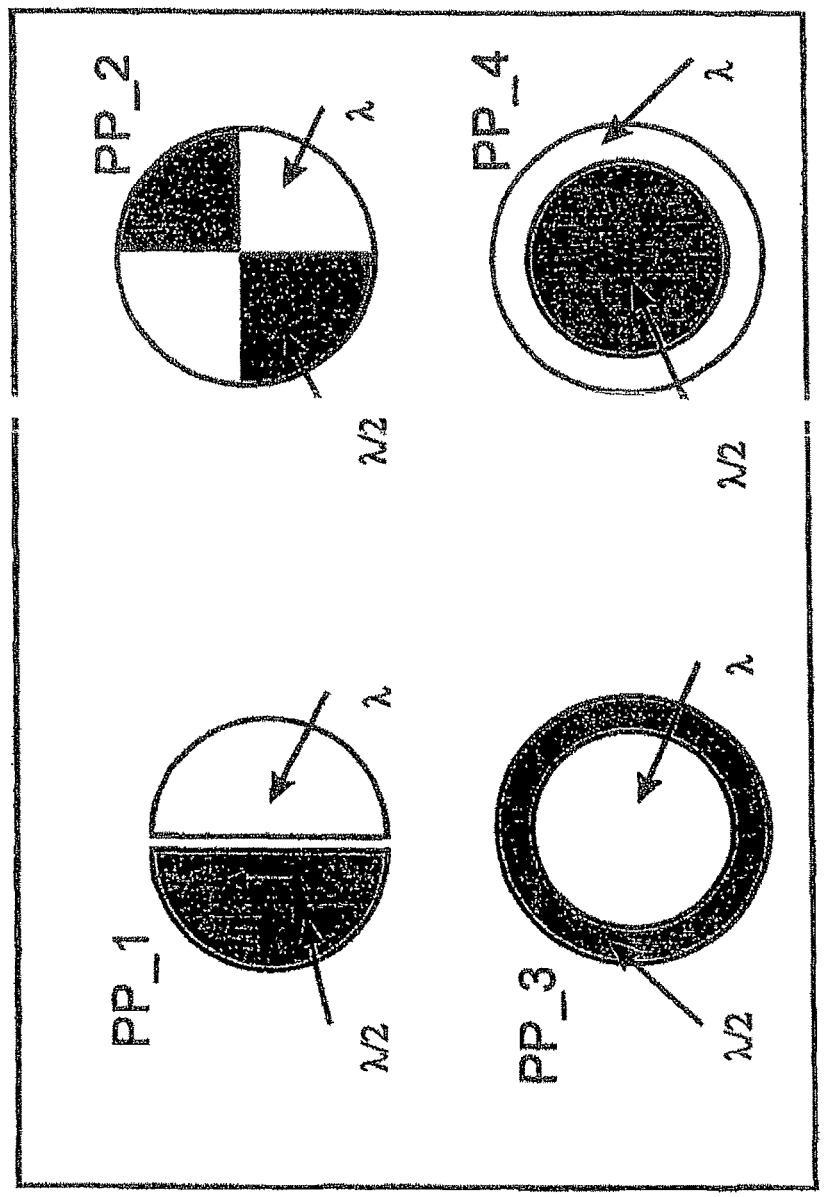
FIG. 3 shows potential associated variants of the phase plate.

The embodiments, described in FIG. 3, can be used as the phase plates PP.

Pulsed lasers that can also be used include a continuous wave (CW) laser, which is switched on and off by means of appropriate rapid switching means.

Figure 5:
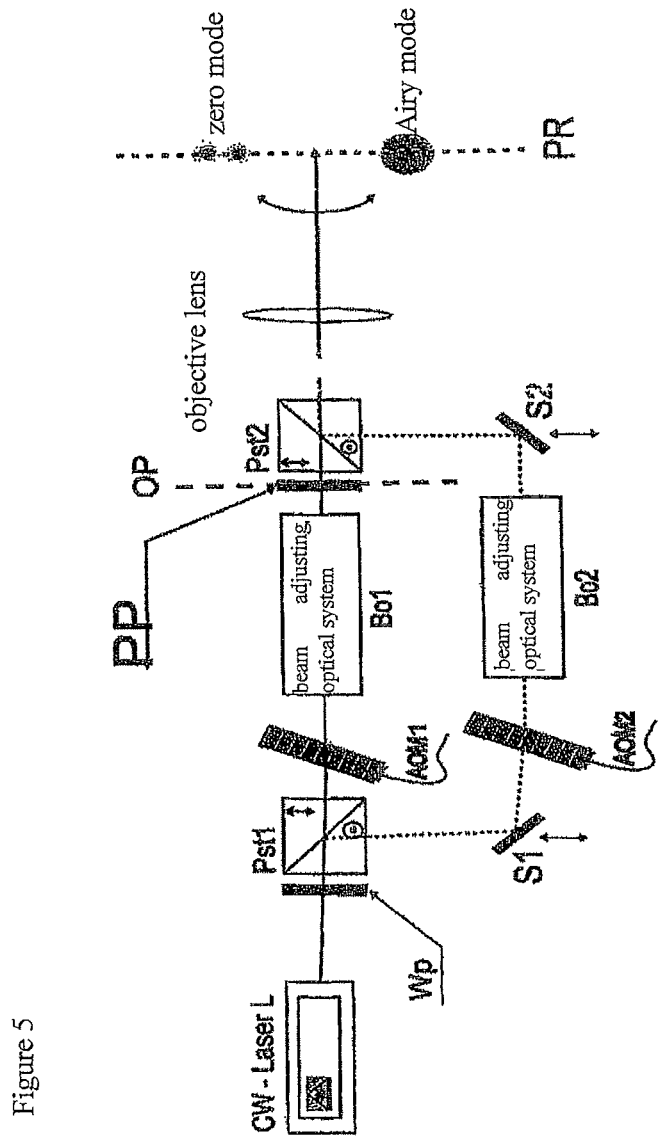
FIG. 5 shows an embodiment using a CW laser.

For the sake completeness it should be noted that the configuration, shown in FIG. 4, can be used as the basis for providing a similar cost effective design using CW laser sources L and two acousto-optical modulators [AOMs] 1, 2. One example of this principle is shown in FIG. 5. Following the beam splitting by means of a polarizing beam splitter Pst1, the light passes through (transmitted and reflected) an acousto-optical modulator (AOM1 or AOM2 respectively) and the respective beam adjusting optical systems Bo1, 2, wherein the first order of diffraction, which is used advantageously in each instance, passes in the direction of the sample PR; and the two AOMs switch on and off the light at a frequency of more than 10 MHz, and said two AOMs are connected in such a way that the amplitudes are out of phase by D/2 in relation to each other.

At variance with the literature [8], the AOMs are used in this case for the pulsed on and off switching of the laser beam in the two light paths.

In this way the pulse sequence, shown in FIG. 4, is generated downstream of the beam splitter Pst2 in such a way that said pulse sequence is offset in time.

The amplitude modulation in the two light paths can be designed, for example, sinusoidal or rectangular, as a function of time.

It should be noted that the method, shown in the FIGS. 4 and 5, works in both linear and nonlinear microscopy. That is, said method can be used for one photon processes as well as for multiphoton processes (second harmonic generation—SHG, third harmonic generation—THG, two photon absorption—TPA [6], coherent anti-Stokes Raman scattering—CARS), wherein in the case of multiphoton interaction the method, shown in FIG. 4 (pulsed laser light source), easily produces usable signals due to the higher peak intensity in the objective lens focus.

This method can be combined advantageously with other methods: point scanning high resolution method: stimulated emission depletion (STED) microscopy, reversible saturable optical (fluorescence) transitions (RESOLFT) microscopy, saturated patterned excitation microscopy (SPEM), structured illumination microscopy (SIM), and FLIM—fluorescence lifetime imaging microscopy.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A microscope, comprising at least one pulsed illuminating beam, which is phase-modulated with a modulation frequency in a partial area of its cross section; a microscope objective lens for focusing the illuminating beam into a sample; a detection beam path; at least one means for demodulation, a first polarizing beam splitter provided in the illuminating beam path upstream of the microscope objective lens, said polarizing beam splitter generating at least a first and second non-interfering partial beams of differing polarization and having the same wavelength, both of said partial beams having different beam paths; a combining element for superimposing said partial beams incoherently, and a phase element provided in the beam path of one of said partial beams, said phase element having at a same time at least two areas with different phase control, said at least two areas being in said beam path of said partial beam and one of said at least two areas relates to said partial area.

2. The microscope as claimed in claim 1, wherein said microscope is a laser scanning microscope and the illuminating beam is formed by a pulsed laser.

3. The microscope as claimed in claim 1, wherein the illuminating beam is formed by a high frequency CW laser, which is switched on and off.

4. The microscope as claimed in claim 1, wherein the phase element is a phase plate.

5. The microscope as claimed in claim 4, wherein the phase plate has an area or areas with a non-influenced phase and an area or areas with an influenced phase.

6. The microscope as claimed in claim 5, wherein the area or areas with an influenced phase is or are at least one lambda/half plate.

7. The microscope as claimed in claim 4, wherein said phase plate is designed in such a way that it can be rotated in the direction of the light upstream of the first polarizing beam splitter for changing the polarization, in order to change the light splitting between the partial beams.

8. The microscope as claimed in claim 1, wherein electronic means are provided for demodulation or there is a change in the operating mode of the detectors for demodulation.

9. The microscope as claimed in claim 8, wherein said electronic means is a lock-in amplification.

10. The microscope as claimed in claim 1, wherein the phase element is a spatial light modulator (SLM).

11. The microscope, as claimed in claim 1, wherein the phase element is a spatial light modulator (SLM).

12. The microscope according to claim 1 wherein said partial beams are adjustable.

13. The microscope according to claim 1 wherein said combining element is a second polarizing beam splitter.

14. A microscopy method, comprising, phase-modulating at least one pulsed illuminating beam with a modulation frequency in a partial area of its cross section and focused into a sample by means of a microscope objective lens for focusing the illuminating beam, and detecting by means of a detection beam path and at least one means for demodulation, using said pulsed illuminating beam for illumination; and generating at least a first and second non-interfering partial beams having the same wavelength and being of differing polarization by a first polarizing beam splitter provided in the illuminating beam path upstream of the microscope objective lens, said partial beams having different beam paths, superimposing said different beam paths incoherently, wherein in one of said partial beam paths a phase element has at a same time a different effect on the phase in at least two areas, said at least two areas being in said beam path of said partial beam and one of said at least two areas relates to said partial area.

15. The method, as claimed in claim 14, wherein the illuminating beam is formed by a pulsed laser.

16. The method, as claimed in claim 14, wherein the illuminating beam is formed by a high frequency CW laser, which is switched on and off.

17. The method, as claimed in claim 14, wherein a phase plate is used as the phase element.

18. The method, as claimed in claim 14, wherein the phase plate has an area or areas with an essentially non-influenced phase and an area or areas with an influenced phase.

19. The method, as claimed in claim 18, wherein the area or areas with an influenced phase is or are at least one lambda/half plate.

20. The method, as claimed in claim 14, wherein a demodulation is performed by electronic means, or there is a change in the operating mode of the detectors for demodulation.

21. The method as claimed in claim 20, wherein said electronic means is a lock-in amplification.

22. The method, as claimed in claim 14, wherein a phase plate is rotated in the direction of the light upstream of the first polarizing beam splitter for changing the polarization, in order to change the light splitting between the partial beams.

23. The method according to claim 14 wherein said step of superimposing said different beam paths is a second polarizing beam splitter.

24. A microscope comprising at least one illuminating beam, which is phase-modulated with a modulation frequency in a partial area of its cross section; a microscope objective lens for focusing the illuminating beam into a sample; a detection beam path and at least one means for demodulation, wherein the illuminating beam is formed by a continuously radiating CW laser; a polarizing beam splitter located in the illuminating beam path upstream of the microscope objective lens, said polarizing beam splitter generating first and second non-interfering partial beams; a combining element provided for superimposing the partial beams incoherently, wherein a phase element is provided in a partial beam path, and a phase element having at a same time at least two areas with different phase control; said two areas being in the beam path of said partial beams and one of said at least two areas relates to said partial area, and acousto-optical elements (AOM) provided in a beam path of both partial beams in order to reciprocally switch on and off the partial beams.

25. A microscopy method, comprising phase demodulating at least one illuminating beam with a modulation frequency in a partial area of its cross section and focusing said illuminating beam into a sample by means of a microscope objective lens for focusing the illuminating beam; detecting by means of a detection beam path and at least one means for demodulation; said illuminating beam being formed by a continuously radiating CW laser; generating first and second non-interfering partial beams by means of a polarizing beam splitter in the illuminating beam path upstream of the microscope objective lens, superimposing said partial beams incoherently by a combining element, wherein in a partial beam path a phase element has a different effect at a same time on the phase in at least two areas; one of said two areas being in said beam path of said partial beam and one of said two areas relates to said partial area, and in one beam path of both partial beams acousto-optical elements (AOM) generate a reciprocating on and off switching of the partial beams.

* * * * *

UNITED STATES PATENT AND TRADEMARK OFFICE
CERTIFICATE OF CORRECTION

PATENT NO. : 10,095,017 B2
APPLICATION NO. : 14/400167
DATED : October 9, 2018
INVENTOR(S) : Tiemo Anhut, Thomas Kalkbrenner and Ralf Netz It is certified that error appears in the above-identified patent and that said Letters Patent is hereby corrected as shown below:

In the Specification

Column 4, Line 50:
Now reads:
"by way of the deflecting mirrors S2 and S3 with a time delay"
Should read:
--by way of the deflecting mirrors S1 and S2 with a time delay--

Signed and Sealed this
Twenty-fifth Day of December, 2018

Andrei Iancu
*Director of the United States Patent and Trademark Office*